United States Patent
Zhu et al.

(10) Patent No.: US 12,087,189 B2
(45) Date of Patent: Sep. 10, 2024

(54) PROJECTION APPARATUS AND PROJECTION METHOD THEREOF

(71) Applicant: Hisense Laser Display Co., Ltd, Qingdao (CN)

(72) Inventors: Yawen Zhu, Qingdao (CN); Peng Zhang, Qingdao (CN); Dabo Guo, Qingdao (CN); Xu Chen, Qingdao (CN); Yishi Zhao, Qingdao (CN); Jidong Zhang, Qingdao (CN)

(73) Assignee: HISENSE LASER DISPLAY CO., LTD, Qingdao (CN)

( * ) Notice: Subject to any disclaimer, the term of this patent is extended or adjusted under 35 U.S.C. 154(b) by 105 days.

(21) Appl. No.: 17/704,407

(22) Filed: Mar. 25, 2022

(65) Prior Publication Data
US 2022/0215781 A1    Jul. 7, 2022

Related U.S. Application Data (63) Continuation of application No. PCT/CN2021/089268, filed on Apr. 23, 2021.

(30) Foreign Application Priority Data

Jun. 17, 2020 (CN) .......................... 202010555370.7

(51) Int. Cl.
*G09G 3/00* (2006.01)
(52) U.S. Cl.
CPC ....... *G09G 3/001* (2013.01); *G09G 2330/021* (2013.01); *G09G 2354/00* (2013.01)
(58) Field of Classification Search
CPC ............. G09G 3/001; G09G 2330/021; G09G 2354/00; G09G 3/002; G03B 31/00; H04N 9/31; H04N 9/3161; H04N 9/3179
See application file for complete search history.

(56) References Cited

U.S. PATENT DOCUMENTS

| | | | | |
|---|---|---|---|---|
| 2006/0007792 A1* | 1/2006 | Bronstein | ............... | G11B 20/10 369/30.01 |
| 2007/0065094 A1* | 3/2007 | Chien | .................... | H04N 5/775 386/230 |

(Continued)

FOREIGN PATENT DOCUMENTS

| CN | 103905758 A | 7/2014 |
|---|---|---|
| CN | 110012527 A | 7/2019 |

(Continued)

OTHER PUBLICATIONS

International Search Report and Written Opinion issued in corresponding International Application No. PCT/CN2021/089268 dated Jul. 21, 2021, with English translation.

*Primary Examiner* — Ricardo Osorio
(74) *Attorney, Agent, or Firm* — Morgan, Lewis & Bockius LLP (57) ABSTRACT

A projection apparatus includes a main control circuit, a power supply, a display driving circuit, an audio playback component and a display component. The main control circuit is configured to send a first image signal to the display driving circuit. The display driving circuit is configured to receive the first image signal, and control the display component to display an image corresponding to the first image signal. The main control circuit is further configured to send a second image signal and an audio signal corresponding to the second image signal to the display driving circuit and the audio playback component, respectively. The display driving circuit is configured to receive the second image signal and control the display component to display an image corresponding to the second image signal, and the audio playback component is configured to receive the audio signal and play audio corresponding to the audio signal.

14 Claims, 8 Drawing Sheets

(56) References Cited

U.S. PATENT DOCUMENTS

| | | | | |
|---|---|---|---|---|
| 2009/0167962 | A1* | 7/2009 | Goodman | 348/739 |
| 2010/0309390 | A1* | 12/2010 | Plut | H04N 9/3147 |
| | | | | 348/744 |
| 2012/0084827 | A1* | 4/2012 | Numano | H04N 21/6125 |
| | | | | 725/110 |
| 2014/0176918 | A1 | 6/2014 | Ozawa et al. | |

FOREIGN PATENT DOCUMENTS

| | | | |
|---|---|---|---|
| CN | 111200746 A | | 5/2020 |
| JP | 2009-27458 A | | 2/2009 |
| JP | 2012173451 A | * | 9/2012 |
| WO | 2010/141149 A2 | | 9/2010 |

* cited by examiner

PROJECTION APPARATUS AND PROJECTION METHOD THEREOF

CROSS-REFERENCE TO RELATED APPLICATIONS

This application is a Continuation Application of International Patent Application No. PCT/CN2021/089268 filed on Apr. 23, 2021, which claims priority to Chinese Patent Application No. 202010555370.7 filed on Jun. 17, 2020, and the entireties are incorporated herein by reference.

TECHNICAL FIELD

The present disclosure relates to the field of projection display, and in particular, to a projection apparatus and a projection method thereof.

BACKGROUND

With the development of laser technologies, laser projection apparatuses have been used widely. In some situations, a laser projection apparatus includes not only a projector but also a projection screen. The projector may project laser beams to the projection screen according to an image to be displayed, so as to display the image on the projection screen.

SUMMARY

In an aspect, a projection apparatus is provided. The projection apparatus includes a main control circuit, a power supply, a display driving circuit, an audio playback component and a display component. The main control circuit is coupled with the power supply, the display driving circuit and the audio playback component. The main control circuit is coupled with the display component through the display driving circuit. The power supply is coupled with the display driving circuit and the audio playback component.

The main control circuit is configured to receive a standby command, send a power-off command to the power supply in response to the standby command, receive a turn-on command, and send a power-on command to the power supply in response to the turn-on command. The power supply is configured to receive the power-off command, stop supplying power to the display driving circuit in response to the power-off command, receive the power-on command, and supply power to the display driving circuit in response to the power-on command.

The main control circuit is further configured to send a first image signal to the display driving circuit. The display driving circuit is configured to receive the first image signal and control the display component to display an image corresponding to the first image signal. The main control circuit is further configured to send a second image signal and an audio signal corresponding to the second image signal to the display driving circuit and the audio playback component respectively. An image corresponding to the second image signal is an image displayed by the display component when the main control circuit receives the standby command. The display driving circuit is configured to receive the second image signal and control the display component to display the image corresponding to the second image signal. The audio playback component is configured to receive the audio signal corresponding to the second image signal and play audio corresponding to the audio signal.

In another aspect, a projection apparatus is provided. The projection apparatus includes a main control circuit, a power supply, a display driving circuit, an audio playback component and a display component. The main control circuit is coupled with the power supply, the display driving circuit and the audio playback component. The main control circuit is coupled with the display component through the display driving circuit. The power supply is coupled with the display driving circuit and the audio playback component.

The main control circuit is configured to receive a standby command, send a power-off command to the power supply in response to the standby command, receive a turn-on command, and send a power-on command to the power supply in response to the turn-on command. The power supply is configured to stop supplying power to the display driving circuit in response to the power-off command and supply power to the display driving circuit in response to the power-on command.

The main control circuit is further configured to send a second image signal and an audio signal corresponding to the second image signal to the display driving circuit and the audio playback component respectively, in a case where it is determined that the display component is in an ON state. An image corresponding to the second image signal is an image displayed by the display component when the main control circuit receives the standby command. The display driving circuit is configured to receive the second image signal and control the display component to display the image corresponding to the second image signal. The audio playback component is configured to receive the audio signal corresponding to the second image signal and play audio corresponding to the audio signal.

In yet another aspect, a projection method of a projection apparatus is provided. The projection apparatus includes a main control circuit, a power supply, a display driving circuit, an audio playback component and a display component. The main control circuit is coupled with the power supply, the display driving circuit and the audio playback component. The main control circuit is coupled with the display component through the display driving circuit. The power supply is coupled with the display driving circuit and the audio playback component.

The projection method includes: the main control circuit receiving a standby command when the display component displays a second image; the main control circuit sending a power-off command to the power supply in response to the standby command; the power supply receiving the power-off command and stopping supplying power to the display driving circuit in response to the power-off command; the main control circuit receiving a turn-on command and sending a power-on command to the power supply in response to the turn-on command; the power supply receiving the power-on command and supplying power to the display driving circuit in response to the power-on command.

The projection method further includes: the main control circuit sending a first image signal to the display driving circuit; the display driving circuit receiving the first image signal and controlling the display component to display an image corresponding to the first image signal; the main control circuit sending a second image signal and an audio signal corresponding to the second image signal to the display driving circuit and the audio playback component respectively; the display driving circuit receiving the second image signal and controlling the display component to display an image corresponding to the second image signal; and the audio playback component receiving the audio signal corresponding to the second image signal and playing audio corresponding to the audio signal.

In yet another aspect, a non-transitory computer-readable storage medium is provided. The non-transitory computer-readable storage medium stores computer program instructions that, when executed by a projection apparatus, perform the projection method of the projection apparatus as described above.

In yet another aspect, a computer program product stored on a non-transitory computer readable storage medium is provided. The computer program product includes computer program instructions, and the computer program instructions cause a computer to perform the projection method of the projection apparatus as described above.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on actual sizes of products, actual processes of methods and actual timings of signals to which the embodiments of the present disclosure relate.

DETAILED DESCRIPTION

Technical solutions in some embodiments of the present disclosure will be described clearly and completely with reference to the accompanying drawings below. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to".

In the description, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, features defined with "first" and "second" may explicitly or implicitly include one or more of the features. In the description of the embodiments of the present disclosure, "a plurality of/the plurality of" means two or more unless otherwise specified.

In the description of some embodiments, the term "coupled" and "connected" and their extensions may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has a same meaning as the phrase "at least one of A, B or C", and both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if", depending on the context, is optionally construed as "when" or "in a case where" or "in response to determining" or "in response to detecting". Similarly, the phrase "if it is determined" or "if a stated condition or event is detected", depending on the context, is optionally construed as "in a case where it is determined" or "in response to determining" or "in a case where the stated condition or event is detected" or "in response to detecting the stated condition or event".

The use of the phrase "applicable to" or "configured to" herein means an open and inclusive language, which does not exclude devices that are applicable to or configured to perform additional tasks or steps.

In addition, the use of the phrase "based on" means openness and inclusiveness, because processes, steps, calculations or other actions "based on" one or more of the stated conditions or values may be based on additional conditions or exceed the stated values in practice.

As used herein, the term "about", "substantially" or "approximately" includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

As used herein, "parallel", "perpendicular" and "equal" include the stated conditions and the conditions similar to the stated conditions, and the range of the similar conditions is within the acceptable deviation range, where the acceptable deviation range is determined by a person of ordinary skill in the art in consideration of the measurement in question and the error associated with the measurement of a specific quantity (i.e., the limitation of the measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°. The term "equal" includes absolute equality and approximate equality, and an acceptable range of deviation of the approximate equality may be, for example, a difference between two equals of less than or equal to 5% of either of the two equals.

Figure 1:
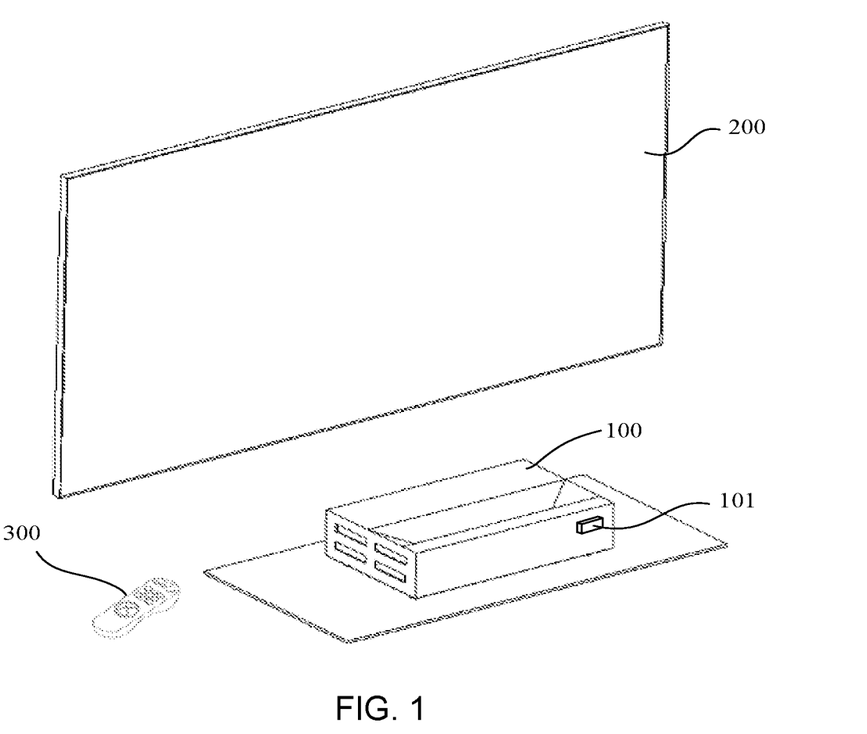
FIG. 1 is a diagram showing a structure of a laser projection apparatus, in accordance with some embodiments of the present disclosure.

FIG. 1 is a diagram showing a structure of a laser projection apparatus according to some embodiments of the present disclosure. As shown in FIG. 1, the laser projection apparatus includes a host 100 and a projection screen 200. In some embodiments, the laser projection apparatus further includes a remote controller 300. The remote controller 300 may send a turn-on command, a turn-off command, a standby command and some adjustment commands, such as a brightness adjustment command, to the host 100. In some embodiments, the host 100 further includes a touch button 101. A user may send the turn-on command, the turn-off command, the standby command and the adjustment command to the host 100 through the touch button 101 without using the remote controller.

Figure 2:
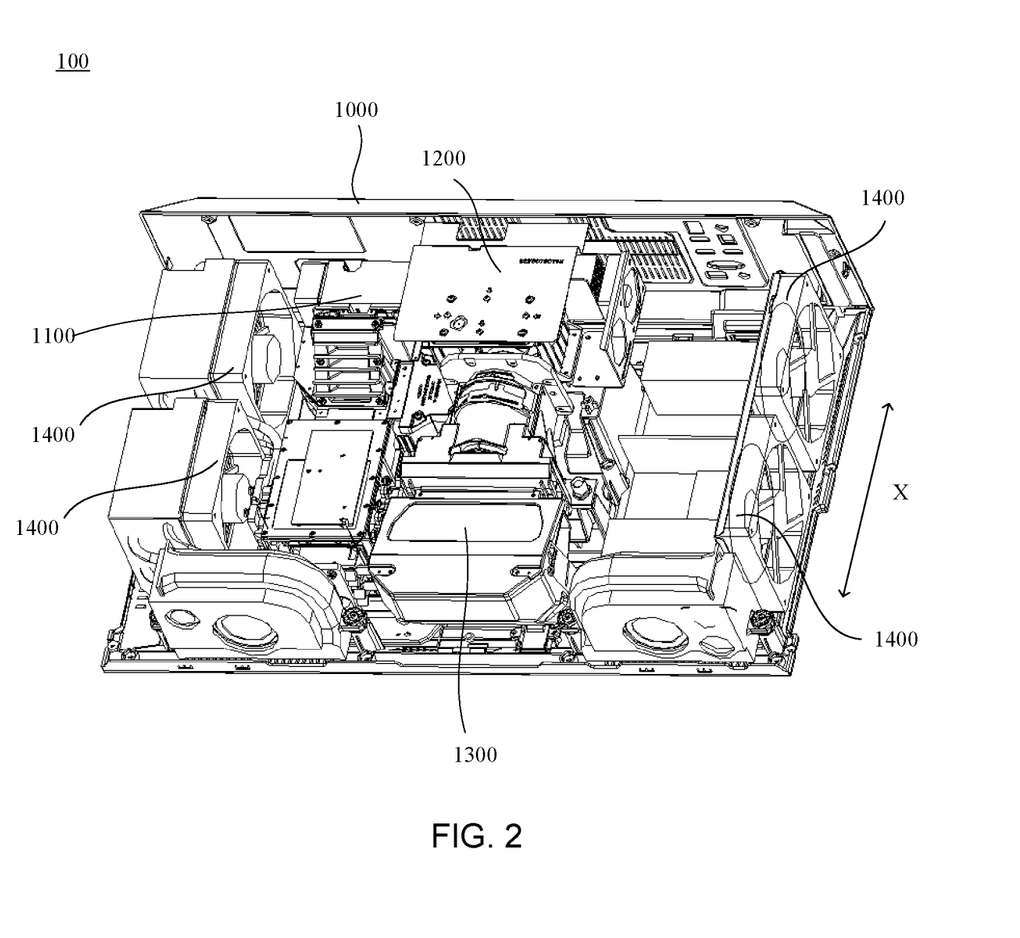
FIG. 2 is a diagram showing a structure of a host in a laser projection apparatus, in accordance with some embodiments of the present disclosure.
Figure 3:
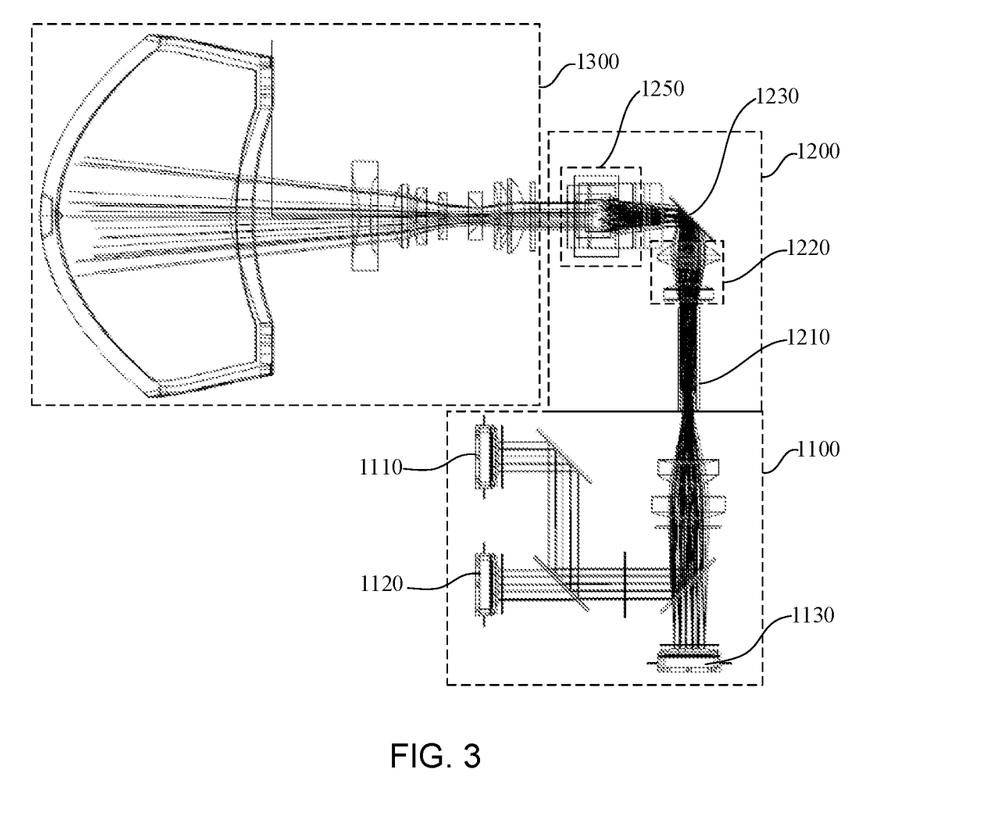
FIG. 3 is a diagram showing a simplified structure of a laser source, an optical engine, and a projection lens in a laser projection apparatus, in accordance with some embodiments of the present disclosure.

FIG. 2 is a diagram showing a structure of a host in a laser projection apparatus according to some embodiments of the present disclosure. As shown in FIG. 2, the host 100 includes an apparatus housing 1000 (only part of the housing 1000 is shown in FIG. 3), and a laser source 1100, an optical engine 1200 and a projection lens 1300 that are assembled in the apparatus housing 1000. The laser source 1100 is configured to provide illumination beams (laser beams). The optical engine 1200 is configured to modulate the illumination beams provided by the laser source 1100 with image signals to obtain projection beams. The projection lens 1300 is configured to project the projection beams on the projection screen 200 for imaging.

The laser source 1100, the optical engine 1200 and the projection lens 1300 are sequentially connected in a propagation direction of light beams, and are each wrapped by a corresponding housing. The respective housings of the laser source 1100, the optical engine 1200 and the projection lens 1300 support corresponding optical components and make the optical components meet certain sealing or airtight requirements. For example, the laser source 1100 is hermetically sealed through its corresponding housing, which may better improve a light attenuation problem of the laser source 1100.

An end of the optical engine 1200 is connected to the projection lens 1300, and the optical engine 1200 and the projection lens 1300 are disposed in a first direction X. For example, the first direction X may be an exit direction of the projection beams of the host 100. The other end of the optical engine 1200 is connected to the laser source 1100. In the example shown in FIG. 3, the laser source 1100, the optical engine 1200 and the projection lens 1300 are connected in an "L" shape. That is, the exit direction of the projection beams of the host 100 is substantially perpendicular to an exit direction of the illumination beams of the host 100. This connection structure may adapt to characteristics of an optical path of a reflective light valve (which will be described later) in the optical engine 1200.

Figure 4:
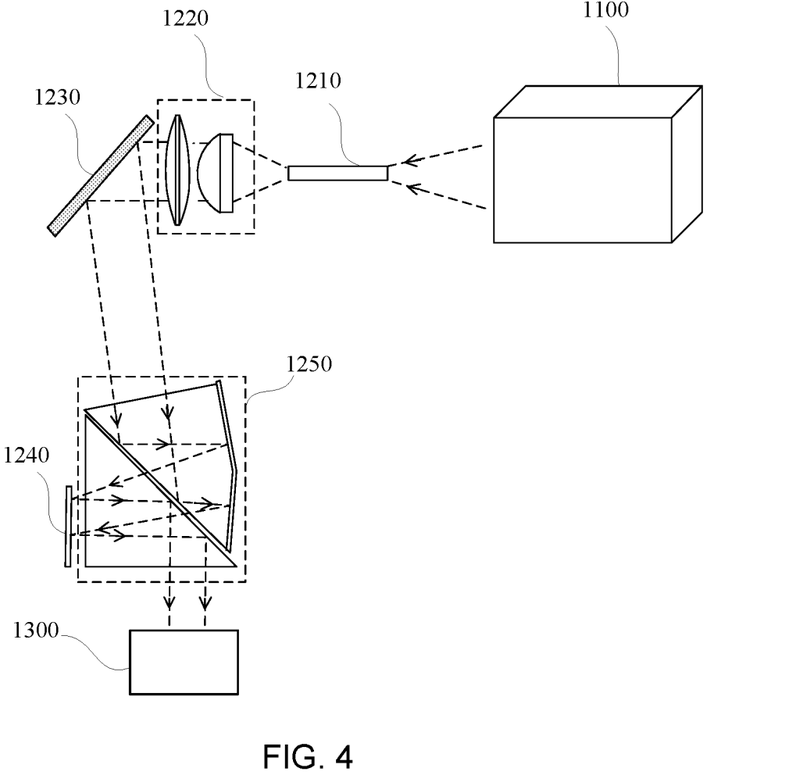
FIG. 4 is a diagram showing an optical path of a laser projection apparatus, in accordance with some embodiments of the present disclosure.

As shown in FIGS. 3 and 4, the laser source 1100 may include three laser arrays. The three laser arrays may be a blue laser array 1110, a green laser array 1120 and a red laser array 1130. That is, the laser source 1100 is a tri-color laser source, but it is not limited to this. The three laser arrays may also all be blue laser arrays 1110, and in this case, the laser source 1100 is a mono-color laser source; alternatively, two laser arrays are blue laser arrays 1110 and one laser array is a red laser array 1130, and in this case, the laser source 1100 is a dual-color laser source.

The illumination beams emitted by the laser source 1100 enter the optical engine 1200. The optical engine 1200 may include a light pipe 1210, a lens assembly 1220, a mirror 1230, a light valve 1240 (which may be a digital micromirror device) and a prism assembly 1250. The light pipe 1210 may receive the illumination beams provided by the laser source 1100 and homogenize the illumination beams. The lens assembly 1220 may first collimate the illumination beams, and then converge the collimated illumination beams and emit the converged illumination beams to the mirror 1230. The mirror 1230 may reflect the illumination beams to the prism assembly 1250. The prism assembly 1250 reflects the illumination beams to the light valve 1240. The light valve 1240 modulates the illumination beams to obtain the projection beams, and reflects the modulated projection beams into the projection lens 1300.

In the optical engine 1200, the light valve 1240 is a core component, which plays a role of modulating the illumination beams provided by the laser source 1100 with the image signals. That is, the light valve 1240 changes the illumination beams to form the projection beams according to colors and brightness required by different pixels of an image to be displayed. Depending on whether the light valve transmits or reflects the illumination beams, the light valve may be classified as a transmissive light valve or a reflective light valve. For example, the light valve 1240 shown in FIG. 4 reflects the illumination beams, and thus it is a reflective light valve. A liquid crystal light valve transmits the illumination beams, and thus it is a transmissive light valve.

The projection lens 1300 includes a combination of a plurality of lenses. The projection lens 1300 may be a zoom projection lens, or a prime adjustable-focus projection lens, or a prime projection lens. In some embodiments, the laser projection apparatus is an ultra-short-focus laser projection apparatus. The projection lens 1300 is an ultra-short-focus projection lens, and a projection ratio of the projection lens 1300 is usually less than 0.3, such as 0.24.

Figure 5:
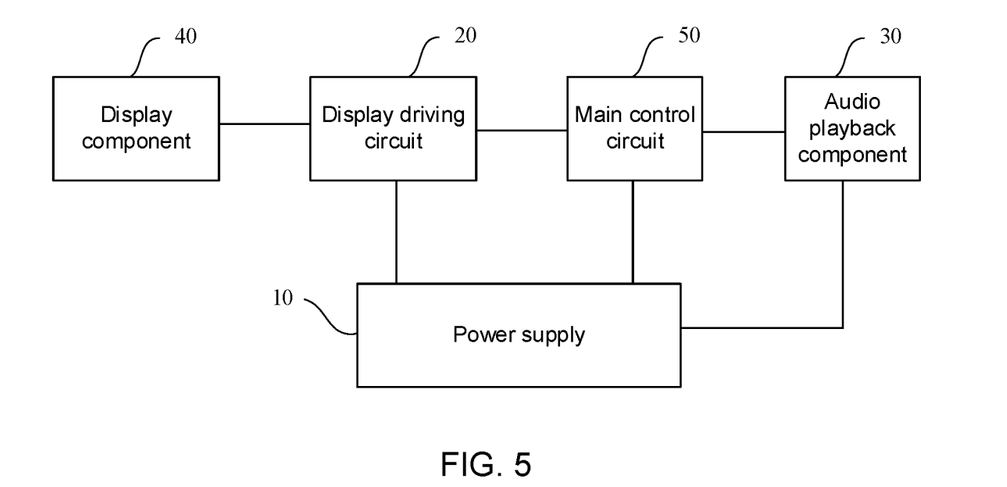
FIG. 5 is a diagram showing a circuit structure of a laser projection apparatus, in accordance with some embodiments of the present disclosure.

The host 100 further includes a printed circuit board assembly (PCBA). The printed circuit board assembly in FIG. 2 is hidden from view by other objects. As shown in FIG. 5, the printed circuit board assembly may include a power supply 10, a display driving circuit 20, an audio playback component 30, a display component 40 and a main control circuit 50. The power supply 10 supplies power to the display driving circuit 20, the audio playback component 30, the display component 40 and the main control circuit 50. The main control circuit 50 is coupled with the display component 40 through the display driving circuit 20, and the main control circuit 50 is further coupled with the audio playback component 30.

Usually, the main control circuit 50 controls the power supply 10 to stop supplying power to the display driving circuit 20 after receiving a standby command to cause the laser projection apparatus to be in a standby mode, and in this case, the display component 40 is turned off. Moreover, the main control circuit 50 saves an image currently displayed by the laser projection apparatus and audio corresponding to the image. In addition, the main control circuit 50 controls the power supply 10 to supply power to the display driving circuit 20 after receiving a turn-on command indicating that the laser projection apparatus is turned on, so that the display driving circuit 20 turns on the display component 40. Moreover, the main control circuit 50 sends the saved image to the display driving circuit 20, and sends the audio corresponding to the image to the audio playback component 30, so as to continue to display the image displayed when the standby command is received and play sounds played when the standby command is received.

However, for some laser projection apparatuses, the power supply only stops supplying power to the display driving circuit during a standby process, but does not stop supplying power to the main control circuit. Therefore, after receiving the turn-on command, the main control circuit may send the saved image to the display driving circuit, and send the audio corresponding to the image to the audio playback component. However, since the display driving circuit will not turn on the display component until the display driving circuit starts, a situation that the audio playback component has already started to play the audio corresponding to the image when the display component has not yet started and displayed the image will occur, so that the played audio is out of sync with the displayed image.

To this end, some embodiments of the present disclosure provide a projection apparatus, which may be the above-mentioned laser projection apparatus. The projection apparatus may include a power supply 10, a display driving circuit 20, an audio playback component 30, a display component 40 and a main control circuit 50. The main control circuit 50 is coupled with the power supply 10, the display driving circuit 20 and the audio playback component 30, and the main control circuit 50 is coupled with the display component 40 through the display driving circuit 20. The power supply 10 is coupled with the display driving circuit 20 and the audio playback component 30.

The main control circuit 50 is configured to receive a standby command, and send a power-off command to the power supply 10 in response to the standby command. The power supply 10 is configured to receive the power-off command and stop supplying power to the display driving circuit 20 in response to the power-off command. In this case, the display component 40 is turned off.

In some embodiments, the main control circuit 50 may further be configured to send a shutdown command to the display driving circuit 20 in response to the standby command, before sending the power-off command to the power supply 10. The display driving circuit 20 is configured to receive the shutdown command and turn off the display component 40 in response to the shutdown command. Then, the main control circuit 50 sends the power-off command to the power supply 10. That is, the main control circuit 50 may be configured to instruct the display driving circuit 20 to turn off the display component 40 first, before the power supply 10 stops supplying power to the display driving circuit 20.

For example, the above-mentioned standby command may be a standby command sent by the user to the main control circuit 50 through the remote controller 300, or may be a standby command sent by the user to the main control circuit 50 through the touch button 101. The present disclosure does not limit a triggering manner of the standby command.

Figure 6:
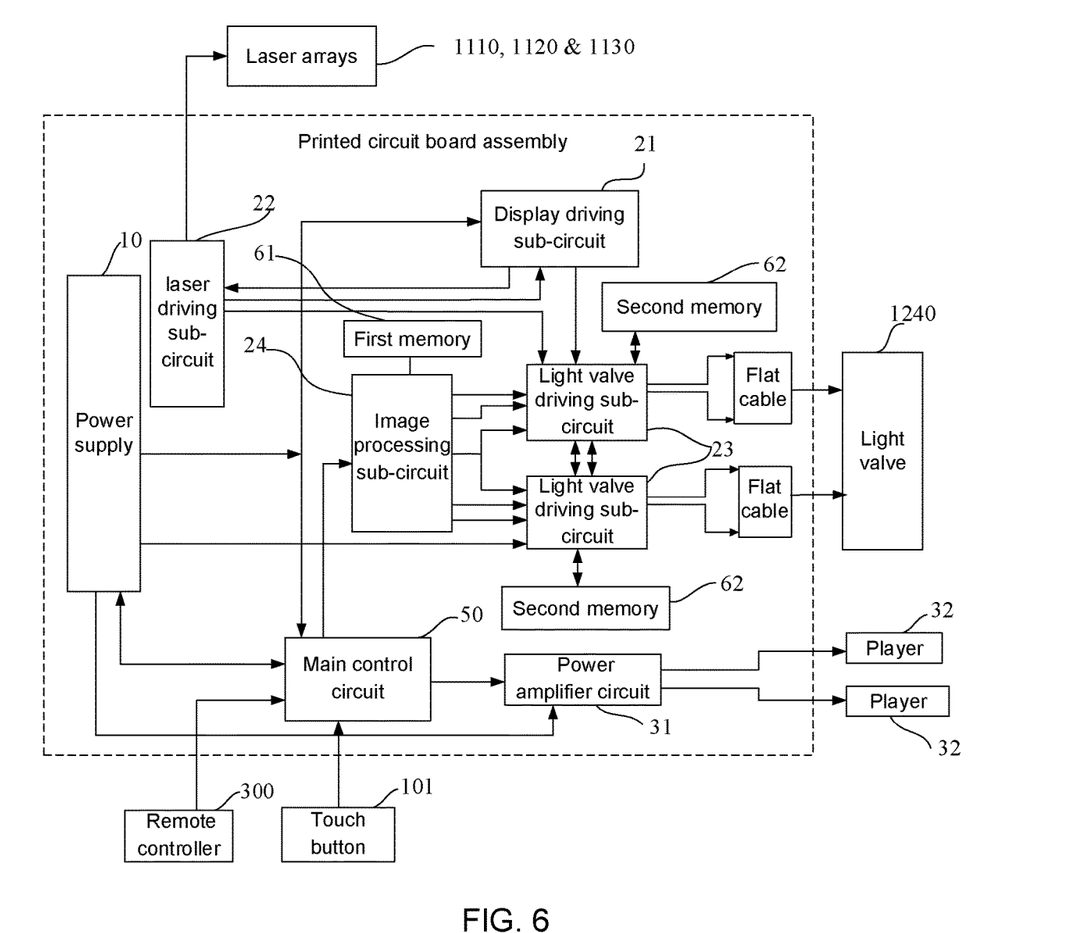
FIG. 6 is a diagram showing a circuit structure of a projection apparatus, in accordance with some embodiments of the present disclosure.

In some embodiments, as shown in FIG. 6, the display driving circuit 20 may include a display driving sub-circuit 21, a laser driving sub-circuit 22 and at least one light valve driving sub-circuit 23. The display driving sub-circuit 21 is coupled with the main control circuit 50, the laser driving sub-circuit 22 and the light valve driving sub-circuit 23. For example, the main control circuit 50 may be coupled with the display driving sub-circuit 21 through an inter-integrated circuit (I2C), and the display driving sub-circuit 21 may also be coupled with the laser driving sub-circuit 22 and the light valve driving sub-circuit 23 through the I2C.

The projection apparatus may further include a fan 1400 (as shown in FIG. 2), and the fan 1400 is connected with the display driving sub-circuit 21. The display component 40 may include a light valve 1240 and at least one laser array. The at least one laser array may include at least one of a blue laser array 1110, a green laser array 1120 or a red laser array 1130. In some embodiments of the present disclosure, the description is made by considering an example where the at least one laser array includes three laser arrays, and the three laser arrays include a blue laser array 1110, a green laser array 1120 and a red laser array 1130. The laser driving sub-circuit 22 is coupled with the laser arrays 1110, 1120 and 1130, and the light valve driving sub-circuit 23 is coupled with the light valve 1240 through a flat cable.

In some embodiments, as shown in FIG. 6, when the display component 40 displays a second image and the audio playback component 30 plays audio corresponding to the second image, if the user triggers a standby command, the main control circuit 50 is configured to receive the standby command and send a shutdown command to the display driving sub-circuit 21 in response to the standby command. The display driving sub-circuit 21 is configured to receive the shutdown command, turn off the fan 1400 in response to the shutdown command, and send the shutdown command to the laser driving sub-circuit 22 and the light valve driving sub-circuit 23. The laser driving sub-circuit 22 is configured to receive the shutdown command, and turn off the laser arrays 1110, 1120 and 1130 in response to the shutdown command. The light valve driving sub-circuit 23 is configured to receive the shutdown command, and turn off the light valve 1240 in response to the shutdown command.

The second image is an image displayed by the display component when the main control circuit receives the standby command. For example, the second image is an image displayed when the projection apparatus is in normal use.

In some embodiments, the power supply 10 is configured to stop supplying power to the display driving sub-circuit 21 and the light valve driving sub-circuit 23 in response to the power-off command. The display driving sub-circuit 21 is configured to stop supplying a drive current to the laser driving sub-circuit 22 after being powered off, so as to control the laser driving sub-circuit 22 to be powered off.

The laser driving sub-circuit 22 is configured to stop supplying a drive current to the laser arrays 1110, 1120 and 1130 after being powered off, so as to control the laser arrays 1110, 1120 and 1130 to be turned off. The light valve driving sub-circuit 23 is configured to stop supplying a drive current to the light valve 1240 after being powered off, so as to control the light valve 1240 to be turned off.

The main control circuit 50 is further configured to receive a turn-on command, and send a power-on command to the power supply 10 in response to the turn-on command. The power supply 10 receives the power-on command and supplies power to the display driving circuit 20 in response to the power-on command.

For example, the above turn-on command may be a turn-on command sent by the user to the main control circuit 50 through the remote controller 300, or may be a turn-on command sent by the user to the main control circuit 50 through the touch button 101. The present disclosure does not limit a triggering manner of the turn-on command.

In some embodiments, the display driving circuit 20 is further configured to control the display component 40 to be turned on after being powered on, and send a start-up completion command for instructing that the display component 40 is turned on to the main control circuit 50.

As shown in FIG. 6, if the user triggers the turn-on command, the main control circuit 50 is configured to receive the turn-on command and send a power-on command to the power supply 10 in response to the turn-on command. The power supply 10 is configured to receive the power-on command and supply power to the display driving sub-circuit 21 and the light valve driving sub-circuit 23 in response to the power-on command. The light valve driving sub-circuit 23 is configured to supply a drive current to the light valve 1240 and turn on the light valve 1240 after it is started up. In this case, the display driving sub-circuit 21 is configured to turn on the fan 1400 and send a start-up command to the laser driving sub-circuit 22 after it is started up. The laser driving sub-circuit 22 is configured to receive the start-up command and be turned on, and supply a drive current to the laser arrays 1110, 1120 and 1130 and turn on the laser arrays 1110, 1120 and 1130 after it is started up. The display driving sub-circuit 21 is further configured to send a start-up completion command to the main control circuit 50 after the laser arrays 1110, 1120 and 1130 are started up.

In some embodiments, as shown in FIG. 6, the display driving circuit 20 may further include an image processing sub-circuit 24, a first memory 61 and at least one second memory 62. The first memory 61 is coupled with the image processing sub-circuit 24, and the at least one second memory 62 is coupled to the at least one light valve driving sub-circuit 23 respectively. The first memory 61 is configured to store programs for initialization and start-up of the image processing sub-circuit 24, and a second memory 62 is configured to store programs for initialization and start-up of the light valve driving sub-circuit 23. The main control circuit 50 is coupled with the light valve driving sub-circuit 23 through the image processing sub-circuit 24.

The power supply 10 is configured to receive a power-off command and stop supplying power to the display driving sub-circuit 21, the light valve driving sub-circuit 23 and the image processing sub-circuit 24 in response to the power-off command. The power supply 10 is further configured to receive a power-on command and supply power to the display driving sub-circuit 21, the light valve driving sub-circuit 23 and the image processing sub-circuit 24 in response to the power-on command. After the power supply 10 supplies power to the image processing sub-circuit 24, the image processing sub-circuit 24 may read the programs stored in the first memory 61 and perform initialization to complete the start-up. Each light valve driving sub-circuit 23 may read programs stored in a second memory 62 connected thereto and perform initialization to complete the start-up.

The main control circuit 50 is further configured to send a first image signal to the display driving circuit 20. The display driving circuit 20 is configured to receive the first image signal and control the display component 40 to display an image corresponding to the first image signal.

For example, the image (which may also be referred to as a first image) corresponding to the first image signal is a black image (e.g., a black image card). Before an image (which may also be referred to as a second image, and the second image is an image displayed by the display component when the main control circuit receives the standby command) corresponding to a second image signal is displayed and audio corresponding to the second image is played, a black first image is displayed first, which may not only enable the display component to be turned on before the display component displays the second image, but also prevent a splash screen or a blue screen on the projection apparatus.

For example, the main control circuit 50 may be configured to send the first image signal to the display driving circuit 20 in response to the turn-on command, and the main control circuit 50 may further be configured to send the first image signal to the display driving circuit 20 in response to the standby command. When the main control circuit 50 is configured to send the first image signal to the display driving circuit 20 in response to the standby command, if the main control circuit 50 receives the turn-on command, the display driving circuit 20 will control the display component to be turned on after being powered on, and the display component may display the image corresponding to the first image signal after being turned on. That is to say, the main control circuit 50 may send the first image signal to the display driving circuit 20 when receiving the standby command, and may also send the first image signal to the display driving circuit 20 when receiving the turn-on command. In the following embodiments, the description is made by considering an example where the main control circuit 50 is configured to send the first image signal to the display driving circuit 20 in response to the turn-on command.

In some embodiments, the main control circuit 50 is configured to send the first image signal to the at least one light valve driving sub-circuit 23 in response to the turn-on command. The at least one light valve driving sub-circuit 23 is configured to receive the first image signal and control operation of the light valve 1240, and the light valve 1240 is configured to modulate the illumination beams irradiated on its surface into the projection beams and reflect the projection beams to the projection screen 200, thereby achieving display of the first image.

In some embodiments, the main control circuit 50 is configured to send the first image signal to the image processing sub-circuit 24 in response to the turn-on command. The image processing sub-circuit 24 is configured to decode image data corresponding to the first image signal, and send the decoded image data to the light valve driving sub-circuit 23. The light valve driving sub-circuit 23 is configured to control operation of the light valve 1240 according to the decoded image data, and the light valve 1240 is configured to modulate the illumination beams irradiating its surface into the projection beams and reflect the projection beams to the projection screen 200, thereby achieving display of an image corresponding to the first image signal.

In some embodiments, the main control circuit 50 is configured to send the first image signal to the display driving circuit 20 in response to the standby command. It will be noted that a manner in which the main control circuit 50 sends the first image signal to the display driving circuit 20 in response to the standby command is the same as a manner in which the main control circuit 50 sends the first image signal to the display driving circuit 20 in response to the turn-on command, which will not be repeated here.

The main control circuit 50 is further configured to send the second image signal to the display driving circuit 20, and send an audio signal corresponding to the second image signal to the audio playback component 30. An image (a second image) corresponding to the second image signal is an image displayed by the display component 40 when the main control circuit 50 receives the above-mentioned standby command. The display driving circuit 20 is configured to receive the second image signal and control the display component 40 to display the image corresponding to the second image signal. The audio playback component is configured to receive the audio signal corresponding to the second image signal, and play audio corresponding to the audio signal.

As shown in FIG. 6, the audio playback component 30 includes a power amplifier circuit 31 and a player 32. The player 32 may be a speaker. The main control circuit 50 is further configured to send the audio signal corresponding to the second image signal to the power amplifier circuit 31, and the power amplifier circuit 31 is configured to control the player 32 to play the audio corresponding to the audio signal.

In some embodiments, the main control circuit 50 is further configured to send the second image signal to the display driving circuit 20, and send the audio signal corresponding to the second image signal to the audio playback component 30, in a case where it is determined that the display component 40 is in an ON state. Therefore, the main control circuit sends the second image signal to the display driving circuit 20, and sends the audio signal corresponding to the second image signal to the audio playback component 30 in the case where display component is in the ON state, which can ensure that the image displayed by the display component is synchronized with the audio played by the audio playback component.

For example, the main control circuit 50 is further configured to obtain an indication value for indicating whether the display component 40 is in the ON state from the display driving circuit 20, and determine that the display component 40 is in the ON state in a case where the indication value is a target value.

For example, considering an example where when the indication value is 1, it indicates that the display component 40 is in the ON state, the main control circuit 50 may obtain the indication value from a register of the display driving sub-circuit 21. When the indication value is 1, the main control circuit 50 determines that the display component 40 is in the ON state.

For example, the main control circuit 50 is further configured to receive a start-up completion command from the display driving circuit 20 and determine that the display component 40 is in the ON state.

For example, as shown in FIG. 6, after the laser arrays 1110, 1120, 1130 and the light valve 1240 are turned on, the display driving sub-circuit 21 is configured to send a start-up completion command to the main control circuit 50, and the main control circuit 50 is configured to receive the start-up completion command and determine that the display component 40 is in the ON state.

In some embodiments of the present disclosure, after the main control circuit receives the turn-on command, and before the main control circuit sends the second image displayed at time the standby command is received and corresponding audio to the display driving circuit and the audio playback component respectively, a black first image is sent to the display driving circuit. Thus, when the audio playback component plays audio, the display component has already been turned on, so that the second image displayed by the display component may be synchronized with the audio corresponding to the second image played by the audio playback component.

In some embodiments, the main control circuit 50 may not send the first image signal to the display driving circuit before sending the second image signal and the audio signal corresponding to the second image signal to the display driving circuit 20 and the audio playback component 30 respectively. Instead, the main control circuit 50 sends the second image signal to the display driving circuit 20 and the audio signal corresponding to the second image signal to the audio playback component 30 after sending the power-on command to the power supply 10 and determining that the display component 40 is in the ON state. In this way, it may also be possible to ensure that the display component has already been turned on before the audio playback component plays audio, which ensures that the second image displayed by the display component can be synchronized with the audio corresponding to the second image played by the audio playback component.

Figure 7:
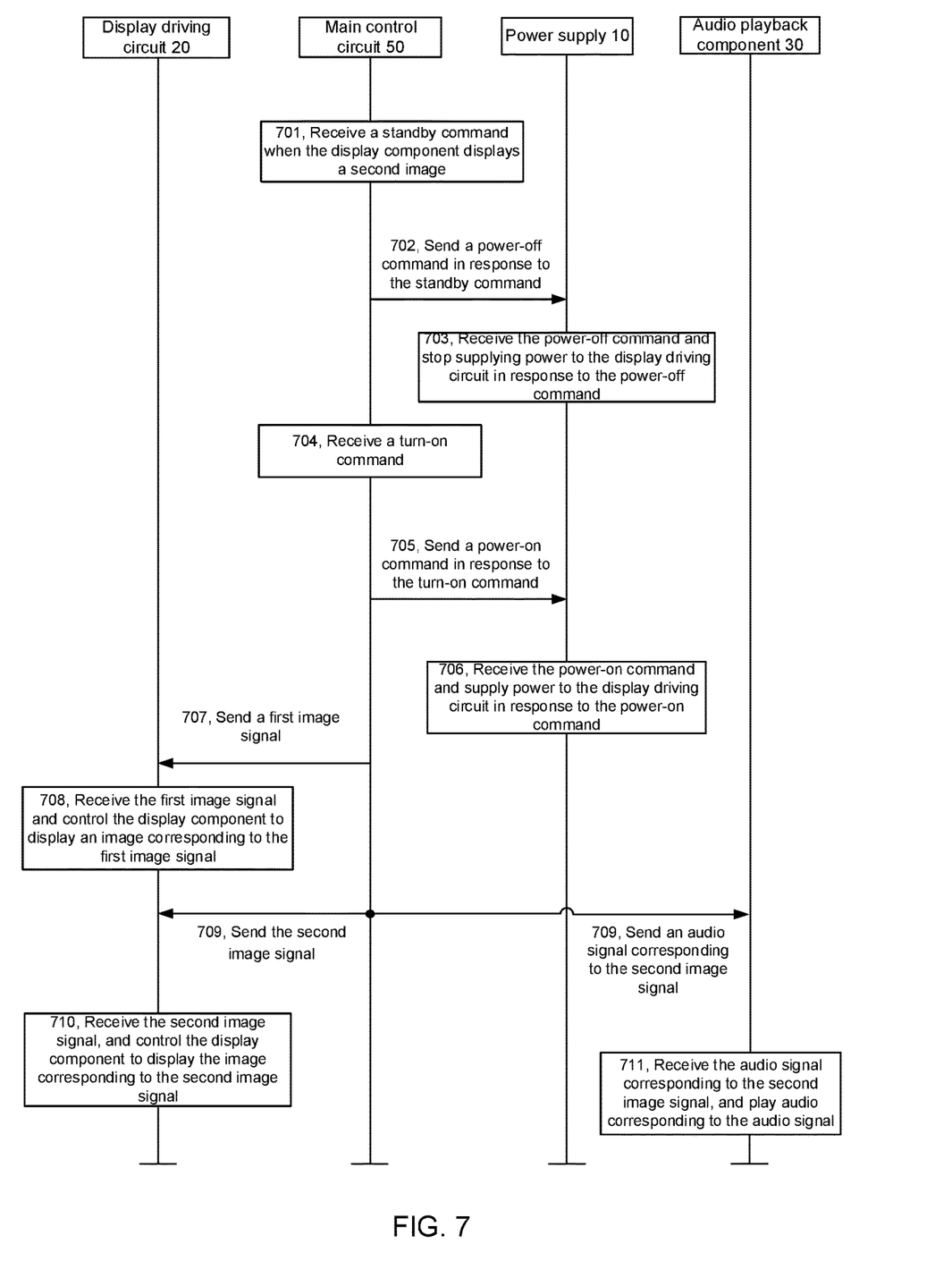
FIG. 7 is a flow diagram of a projection method of a projection apparatus, in accordance with some embodiments of the present disclosure.

Some embodiments of the present disclosure further provide a projection method of a projection apparatus, and the projection apparatus may be any of the above-mentioned projection apparatuses. As shown in FIG. 7, the projection method may include steps 701 to 711.

In step 701, when the display component displays a second image, the main control circuit 50 receives a standby command.

In step 702, the main control circuit 50 sends a power-off command to the power supply 10 in response to the standby command.

In some embodiments, the main control circuit 50 may first send a shutdown command to the display driving circuit 20 before sending the power-off command to the power supply 10. After the display driving circuit 20 receives the shutdown command and turns off the display component in response to the shutdown command, the power supply 10 stops supplying power to the display driving circuit 20.

In step 703, the power supply 10 receives the power-off command and stops supplying power to the display driving circuit 20 in response to the power-off command.

In step 704, the main control circuit 50 receives a turn-on command.

In step 705, the main control circuit 50 sends a power-on command to the power supply 10 in response to the turn-on command.

In step 706, the power supply 10 receives the power-on command and supplies power to the display driving circuit 20 in response to the power-on command.

In some embodiments, the display driving circuit 20 controls the display component to be turned on after being powered on, and sends a start-up completion command for instructing that the display component is turned on to the main control circuit 50.

In step 707, the main control circuit 50 sends a first image signal to the display driving circuit 20.

In some embodiments, the main control circuit 50 may send the first image signal to the display driving circuit 20 in response to the turn-on command.

In some embodiments, the main control circuit 50 may send the first image signal to the display driving circuit 20 in response to the standby command.

In step 708, the display driving circuit 20 receives the first image signal and controls the display component to display an image corresponding to the first image signal.

In step 709, the main control circuit 50 sends a second image signal to the display driving circuit 20, and sends an audio signal corresponding to the second image signal to the audio playback component 30.

In some embodiments, an image corresponding to the second image signal is an image displayed by the display component when the main control circuit 50 receives the standby command.

In step 710, the display driving circuit 20 receives the second image signal, and controls the display component to display an image corresponding to the second image signal.

In step 711, the audio playback component 30 is configured to receive the audio signal corresponding to the second image signal, and play audio corresponding to the audio signal.

It will be noted that some embodiments of the present disclosure do not limit an execution sequence of the foregoing steps 701 to 711, and FIG. 7 is an exemplary diagram. For example, step 707 may be performed after step 704, or may be performed after step 701 and before step 704. For another example, step 705 and step 707 may be performed simultaneously.

In some embodiments of the present disclosure, after the main control circuit 50 receives the turn-on command, and before the main control circuit 50 sends the second image displayed at time the standby command is received to the display driving circuit 20 and corresponding audio to the audio playback component 30, a first image (e.g., the first image is a black image) is sent to the display driving circuit 20. Thus, the display component has already been turned on when the audio playback component 30 plays audio, so that the second image displayed by the display component may be synchronized with the audio corresponding to the second image played by the audio playback component 30.

Figure 8:
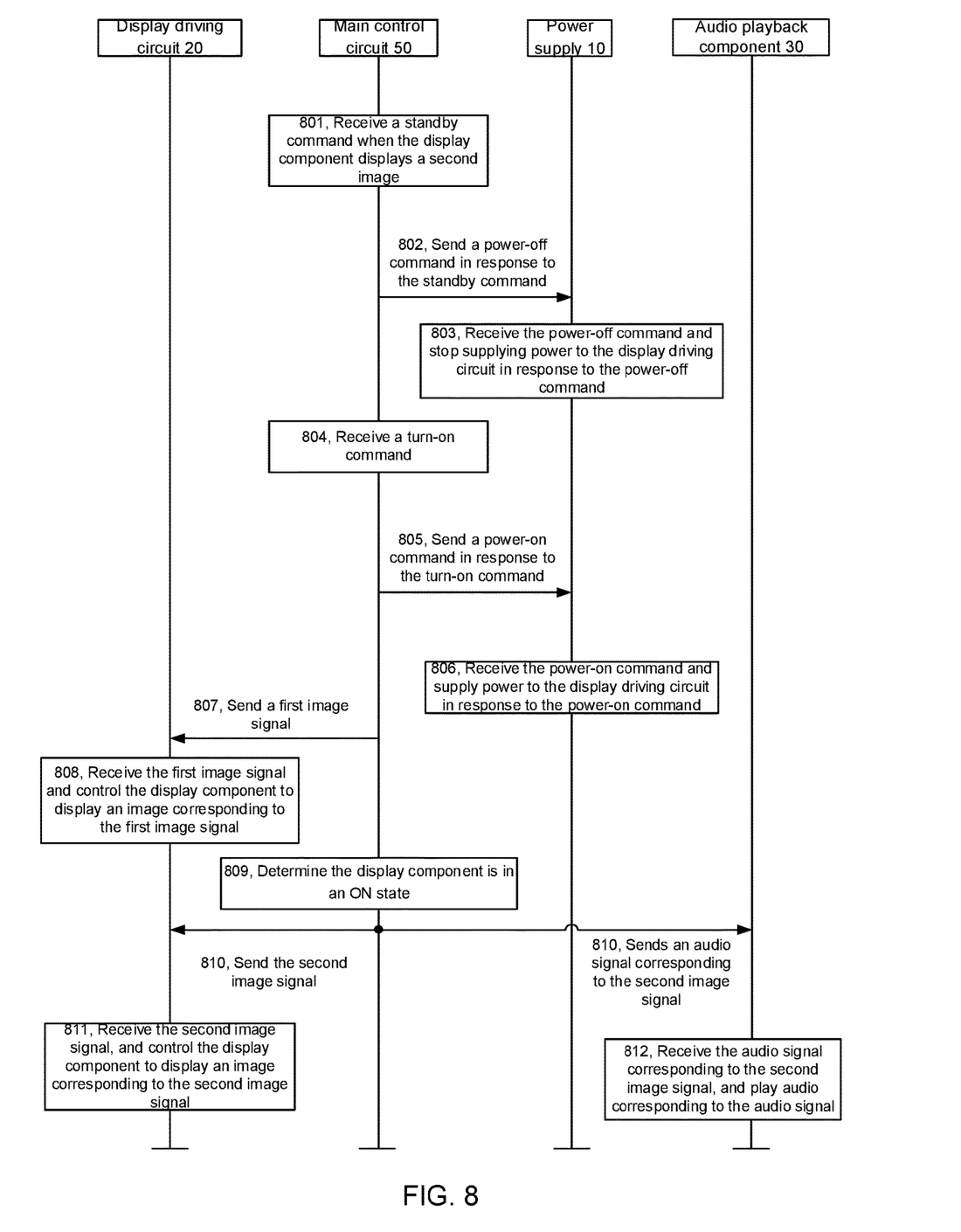
FIG. 8 is a flow diagram of another projection method of a projection apparatus, in accordance with some embodiments of the present disclosure.

In order to further ensure that the second image displayed by the display component may be synchronized with the audio corresponding to the second image played by the audio playback component, some embodiments of the present disclosure further provide a projection method of a projection apparatus, and the projection apparatus may be any of the above-mentioned projection apparatuses. As shown in FIG. 8, the projection method includes steps 801 to 811.

In step 801, when the display component displays a second image, the main control circuit 50 receives a standby command.

In step 802, the main control circuit 50 sends a power-off command to the power supply 10 in response to the standby command.

In some embodiments, the main control circuit 50 may send a shutdown command to the display driving circuit 20 before sending the power-off command to the power supply 10. The display driving circuit 20 receives the shutdown command and turns off the display component in response to the shutdown command.

In step 803, the power supply 10 receives the power-off command and stops supplying power to the display driving circuit 20 in response to the power-off command.

In step 804, the main control circuit 50 receives a turn-on command.

In step 805, the main control circuit 50 sends a power-on command to the power supply 10 in response to the turn-on command.

In step 806, the power supply 10 receives the power-on command and supplies power to the display driving circuit 20 in response to the power-on command.

In some embodiments, the display driving circuit 20 controls the display component to be turned on after being powered on, and sends a start-up completion command for instructing that the display component is turned on to the main control circuit 50.

In step 807, the main control circuit 50 sends a first image signal to the display driving circuit 20.

In some embodiments, the main control circuit 50 may send the first image signal to the display driving circuit 20 in response to the turn-on command.

In some embodiments, the main control circuit 50 may send the first image signal to the display driving circuit 20 in response to the standby command.

In step 808, the display driving circuit 20 receives the first image signal and controls the display component to display an image corresponding to the first image signal.

In step 809, the main control circuit 50 determines that the display component is in an ON state.

For example, the main control circuit 50 obtains an indication value for indicating whether the display component is in the ON state from the display driving circuit 20, and determines that the display component is in the ON state in a case where the indication value is a target value.

For example, the main control circuit 50 may further receive a start-up completion command from the display driving circuit 20, and determine that the display component is in the ON state.

In step 810, the main control circuit 50 sends a second image signal to the display driving circuit 20, and sends an audio signal corresponding to the second image signal to the audio playback component 30.

In step 811, the display driving circuit 20 receives the second image signal, and controls the display component to display an image corresponding to the second image signal.

In step 812, the audio playback component 30 is configured to receive the audio signal corresponding to the second image signal, and play audio corresponding to the audio signal.

The embodiments of the present disclosure do not limit an execution sequence of the foregoing steps 801 to 812. For example, step 805 and step 807 may be performed simultaneously, and step 808 and step 809 may be performed simultaneously.

In some embodiments of the present disclosure, in a case where the display component is in the ON state, the main control circuit 50 sends the second image signal to the display driving circuit 20 and the audio signal corresponding to the second image signal to the audio playback component 30, which may further ensure that an image displayed by the display component is synchronized with audio played by the audio playback component 30.

Figure 9:
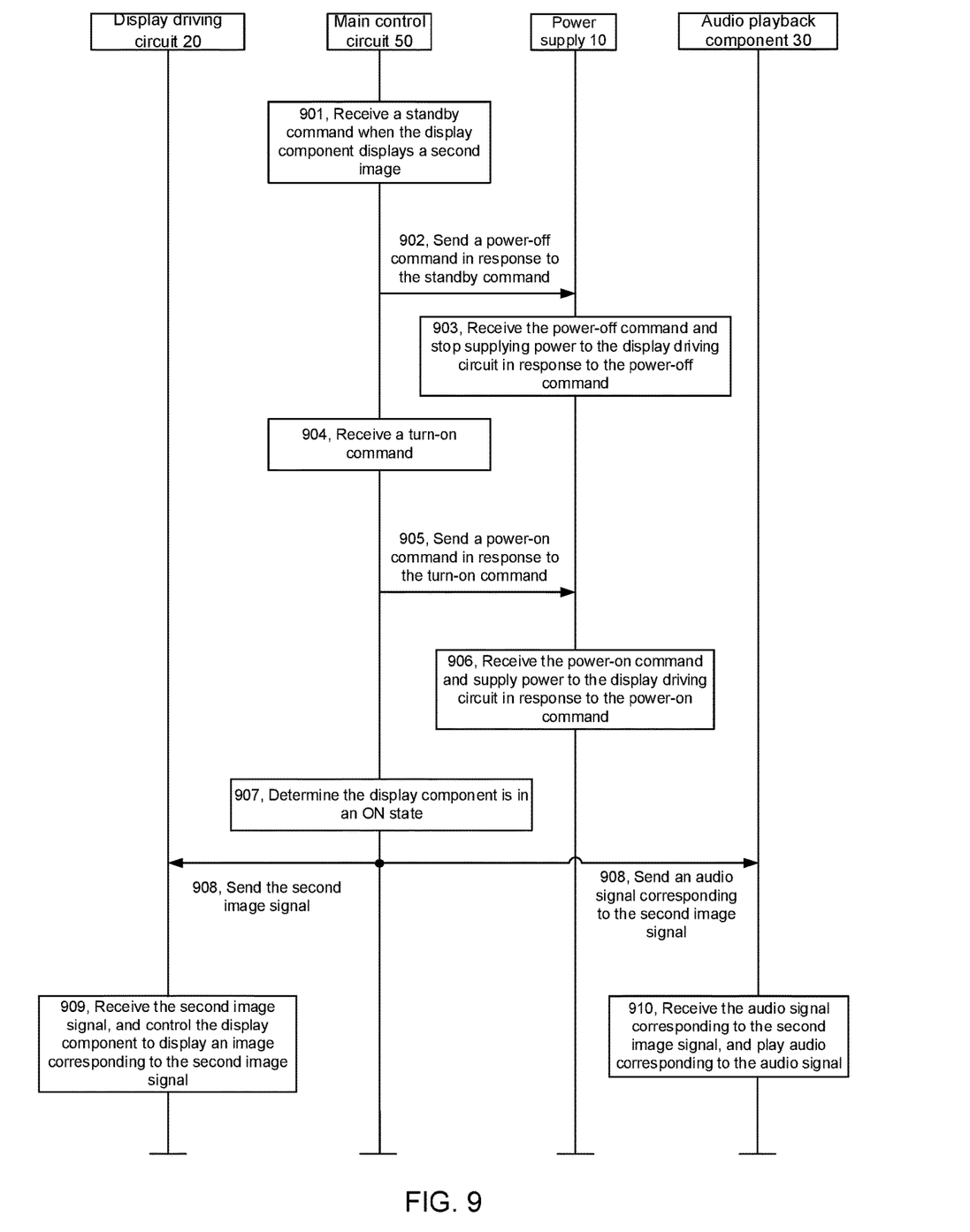
FIG. 9 is a flow diagram of yet another projection method of a projection apparatus, in accordance with some embodiments of the present disclosure.

Some embodiments of the present disclosure further provide another projection method of a projection apparatus, and the projection apparatus may be any of the above-mentioned projection apparatuses. As shown in FIG. 9, the projection method may include steps 901 to 910.

In step 901, when the display component displays a second image, the main control circuit 50 receives a standby command.

In step 902, the main control circuit 50 sends a power-off command to the power supply 10 in response to the standby command.

In step 903, the power supply 10 receives the power-off command and stops supplying power to the display driving circuit 20 in response to the power-off command.

In step 904, the main control circuit 50 receives a turn-on command.

In step 905, the main control circuit 50 sends a power-on command to the power supply 10 in response to the turn-on command.

In step 906, the power supply 10 receives the power-on command and supplies power to the display driving circuit 20 in response to the power-on command.

In step 907, the main control circuit 50 determines that the display component is in an ON state.

A manner in which the main control circuit 50 determines whether the display component is in the ON state here is the same as that in step 809, which will not be repeated here.

In step 908, the main control circuit 50 sends a second image signal to the display driving circuit 20, and sends an audio signal corresponding to the second image signal to the audio playback component 30.

In step 909, the display driving circuit 20 receives the second image signal, and controls the display component to display an image corresponding to the second image signal.

In step 910, the audio playback component 30 is configured to receive the audio signal corresponding to the second image signal, and play audio corresponding to the audio signal.

The embodiments of the present disclosure do not limit an execution sequence of the foregoing steps 901 to 910. For example, step 905 and step 907 may be performed simultaneously.

In some embodiments of the present disclosure, before sending the second image signal to the display driving circuit 20 and the audio signal corresponding to the second image signal to the audio playback component 30, the main control circuit 50 may not send the first image signal to the display driving circuit 20. Instead, the main control circuit 50 sends the second image signal to the display driving circuit 20 and the audio signal corresponding to the second image signal to the audio playback component 30 after sending the power-on command to the power supply 10 and determining that the display component 40 is in the ON state. In this way, it may also be possible to ensure that the display component has already been turned on before the audio playback component plays audio, which ensures that the second image displayed by the display component can be synchronized with the audio corresponding to the second image played by the audio playback component.

Some embodiments of the present disclosure provide a computer-readable storage medium (e.g., a non-transitory computer-readable storage medium). The computer-readable storage medium stores computer program instructions that, when executed by a projection apparatus, cause the projection apparatus to perform one or more steps in the projection method of the projection apparatus described in any of the foregoing embodiments.

Some embodiments of the present disclosure provide a computer program product stored on a non-transitory computer-readable storage medium, and the computer program product includes computer program instructions that cause a computer (e.g., a projection apparatus) to perform the projection method of the projection apparatus shown in any of the embodiments of FIGS. 7 to 9.

For example, the computer-readable storage medium may include, but is not limited to: a magnetic storage device (e.g., a hard disk, a floppy disk, or a magnetic tape), an optical disk (e.g., a compact disk (CD)), a digital versatile disk (DVD), a smart card and a flash memory device (e.g., an erasable programmable read-only memory (EPROM), a card, a stick or a key drive). The various computer-readable storage media described in the present disclosure may represent one or more devices and/or other machine-readable storage media for storing information. The term "machine-readable storage media" may include, but are not limited to, wireless channels and various other media capable of storing, containing, and/or carrying instruction(s) and/or data.

The foregoing descriptions are merely specific implementations of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the scope of the present disclosure shall be subject to the protection scope of the claims.

What is claimed is:

1. A projection method of a projection apparatus, the projection apparatus including a main control circuit, a power supply, a display driving circuit, an audio playback component and a display component, the main control circuit being coupled with the power supply, the display driving circuit and the audio playback component, the main control circuit being coupled with the display component through the display driving circuit, and the power supply being coupled with the display driving circuit and the audio playback component, wherein the projection method comprises:
    receiving, by the main control circuit, a standby command when the display component displays a second image;
    sending, by the main control circuit, a power-off command to the power supply in response to the standby command;
    receiving, by the power supply, the power-off command, and stopping, by the power supply, supplying power to the display driving circuit in response to the power-off command;
    sending, by the main control circuit, a shutdown command to the display driving circuit in response to the standby command, before sending the power-off command to the power supply;
    receiving, by the display driving circuit, the shutdown command, and turning off, by the display driving circuit, the display component in response to the shutdown command;
    receiving, by the main control circuit, a turn-on command, and sending, by the main control circuit, a power-on command to the power supply in response to the turn-on command;
    receiving, by the power supply, the power-on command, and supplying, by the power supply, power to the display driving circuit in response to the power-on command;
    sending, by the main control circuit, a first image signal to the display driving circuit;
    receiving, by the display driving circuit, the first image signal, and controlling, by the display driving circuit, the display component to display an image corresponding to the first image signal;

sending, by the main control circuit, a second image signal and an audio signal corresponding to the second image signal to the display driving circuit and the audio playback component respectively;

receiving, by the display driving circuit, the second image signal, and controlling, by the display driving circuit, the display component to display an image corresponding to the second image signal; and receiving, by the audio playback component, the audio signal corresponding to the second image signal, and playing, by the audio playback component, audio corresponding to the audio signal;

wherein sending, by the main control circuit, a second image signal and an audio signal corresponding to the second image signal to the display driving circuit and the audio playback component respectively includes:

determining, by the main control circuit, that the display component is in an ON state, after sending the first image signal to the display driving circuit; and sending, by the main control circuit, the second image signal and the audio signal corresponding to the second image signal to the display driving circuit and the audio playback component respectively.

2. A projection apparatus using the projection method according to claim 1, the projection apparatus comprising:

a main control circuit, a power supply, a display driving circuit, an audio playback component and a display component, the main control circuit being coupled with the power supply, the display driving circuit and the audio playback component, the main control circuit being coupled with the display component through the display driving circuit, and the power supply being coupled with the display driving circuit and the audio playback component; wherein the main control circuit is configured to: receive a standby command, send a power-off command to the power supply in response to the standby command, receive a turn-on command, and send a power-on command to the power supply in response to the turn-on command;

the power supply is configured to: receive the power-off command, stop supplying power to the display driving circuit in response to the power-off command, receive the power-on command, and supply power to the display driving circuit in response to the power-on command;

the main control circuit is further configured to send a shutdown command to the display driving circuit in response to the standby command, before sending the power-off command to the power supply; and the display driving circuit is configured to receive the shutdown command and turn off the display component in response to the shutdown command;

the main control circuit is further configured to send a first image signal to the display driving circuit;

the display driving circuit is configured to receive the first image signal and control the display component to display an image corresponding to the first image signal;

the main control circuit is further configured to send a second image signal and an audio signal corresponding to the second image signal to the display driving circuit and the audio playback component respectively, in response to a determination that the display component is in an ON state, after sending the first image signal to the display driving circuit; an image corresponding to the second image signal is an image displayed by the display component when the main control circuit receives the standby command;

the display driving circuit is configured to receive the second image signal and control the display component to display the image corresponding to the second image signal; and the audio playback component is configured to receive the audio signal corresponding to the second image signal and play audio corresponding to the audio signal.

3. The projection apparatus according to claim 2, wherein the main control circuit is configured to send the first image signal to the display driving circuit in response to the turn-on command.

4. The projection apparatus according to claim 2, wherein the main control circuit is configured to send the first image signal to the display driving circuit in response to the standby command.

5. The projection apparatus according to claim 2, wherein the main control circuit is further configured to obtain an indication value for indicating whether the display component is in the ON state from the display driving circuit, and determine that the display component is turned on in response to a determination that the indication value is a target value.

6. The projection apparatus according to claim 2, wherein the display driving circuit is further configured to control the display component to be turned on after the display driving circuit is powered on, and send a start-up completion command for indicating that the display component is turned on to the main control circuit; and the main control circuit is further configured to receive the start-up completion command, and determine that the display component is in the ON state.

7. The projection apparatus according to claim 2, wherein the image corresponding to the first image signal is a black image.

8. The projection method according to claim 1, wherein sending, by the main control circuit, a first image signal to the display driving circuit includes:

sending, by the main control circuit, the first image signal to the display driving circuit in response to the turn-on command.

9. The projection method according to claim 1, wherein sending, by the main control circuit, a first image signal to the display driving circuit includes:

sending, by the main control circuit, the first image signal to the display driving circuit in response to the standby command.

10. The projection method according to claim 1, wherein determining, by the main control circuit, that the display component is in an ON state includes:

obtaining, by the main control circuit, an indication value for indicating whether the display component is in the ON state from the display driving circuit, and determining, by the main control circuit, that the display component is in the ON state in response to determination that the indication value is a target value.

11. The projection method according to claim 1, further comprising:

controlling, by the display driving circuit, the display component to be turned on after the display driving circuit is powered on, and sending, by the display driving circuit, a start-up completion command for indicating that the display component is turned on to the main control circuit; and determining, by the main control circuit, that the display component is in an ON state including:

receiving, by the main control circuit, the start-up completion command from the display driving circuit, and determining, by the main control circuit, that the display component is in the ON state.

12. The projection method according to claim 1, wherein the image corresponding to the first image signal is a black image.

13. A non-transitory computer-readable storage medium storing computer program instructions that, when executed by a projection apparatus, cause the projection apparatus to perform the projection method according to claim 1.

14. A computer program product stored on a non-transitory computer readable storage medium, comprising computer program instructions, wherein the computer program instructions cause a computer to perform the projection method of the projection apparatus according to claim 1.

* * * * *